United States Patent [19]

Foley

[11] Patent Number: 4,979,067

[45] Date of Patent: Dec. 18, 1990

[54] VOLTAGE AND CURRENT LIMITING POWER SUPPLY

[75] Inventor: Raymond J. Foley, Toledo, Ohio

[73] Assignee: Illinois Tool Works, Inc., Glenview, Ill.

[21] Appl. No.: 369,024

[22] Filed: Jun. 20, 1989

[51] Int. Cl.[5] .......... H02H 3/20

[52] U.S. Cl. .......... 361/18; 361/56

[58] Field of Search .......... 361/18, 56, 55, 91, 361/111, 42, 74, 75, 86, 33; 363/56, 55, 52, 58, 50

[56] References Cited

U.S. PATENT DOCUMENTS

| | | | |
|---|---|---|---|
| 4,099,216 | 7/1978 | Weberg | 361/56 |
| 4,412,265 | 10/1983 | Bauck | 361/56 |
| 4,860,151 | 8/1989 | Hutcheon et al. | 361/56 X |

OTHER PUBLICATIONS

J. Markus, Guidebook of Electronic Circuits, 1974, p. 1013.

*Primary Examiner*—Todd E. DeBoer

*Attorney, Agent, or Firm*—MacMillan, Sobanski & Todd

[57] ABSTRACT

A circuit for delivering power to a load at a predetermined voltage and current. The circuit limits the voltage and current available at the load in the event that the load becomes either detached from the circuit or short circuited to facilitate safe operation of the load in an explosive environment such as a paint spray booth. The current is limited by a constant current source and the voltage is limited either by the maximum output voltage from the constant current source or be a zener barrier circuit.

6 Claims, 1 Drawing Sheet

VOLTAGE AND CURRENT LIMITING POWER SUPPLY

TECHNICAL FIELD

The invention relates to power supplies and more particularly to an improved power supply capable of supplying a predetermined voltage and current to a load and which will not exceed a predetermined maximum output voltage when the load is disconnected from the power supply or a predetermined maximum current when the load is short circuited.

BACKGROUND ART

It is sometimes necessary to supply power to a load located in a hazardous environment. For example, electric solenoid controlled valves are sometimes located in paint spray booths for controlling the supply of paint and air to an automatic spray gun. When the paint is atomized during spraying, highly volatile, flammable paint solvents may be present in the spray booth. If the power supply wires connected to a valve actuating solenoid should become either open circuited or short circuited, there is a risk of a spark causing a fire or an explosion in the spray booth. In a conventional power supply for operating paint valve solenoids, a zener barrier circuit consisting of zener diodes and resistors may be used to limit the amount of energy available for ignition within the spray booth. The amount of current available to the load is limited by the series resistance of the zener barrier circuit and the characteristic input impedance of the load device. When the load becomes detached, the available voltage is clamped by the zener diodes to a level above the normal operating voltage for the load, but the current is only limited by the series resistance of the zener barrier circuit. The available current may be much higher than the normal operating current of the load.

DISCLOSURE OF INVENTION

The power supply of the invention differs from the prior art in that the maximum current and voltage available at the load are limited to substantially that current and voltage required to operate the load. In the event of the load becoming detached, the available current is limited through the use of a constant current power source and the maximum voltage is limited both by the maximum output voltage from the constant current power source and by a conventional zener barrier circuit. The output current from the power source, the resistance of the load and the series resistance of the zener barrier circuit determine the voltage applied to the load by the current source. The constant current source provides the required total voltage at the designated current level and adjusts for fluctuations in the input source voltage. If the load becomes detached in an explosive environment, either the maximum voltage capability of the constant current source or the zener diodes will establish the maximum output voltage. However, the maximum available current for ignition is no more than with the load attached by virtue of the constant current source maintaining and limiting the available current.

Accordingly, it is an object of the invention to provide an improved circuit for supplying power to a load and for limiting the available voltage and current in the event that the load becomes either short circuited or detached from the power supply circuit.

Other objects and advantages of the invention will be apparent from the following description and the attached drawing.

BEST MODE FOR CARRYING OUT THE INVENTION

Figures 1, 2:
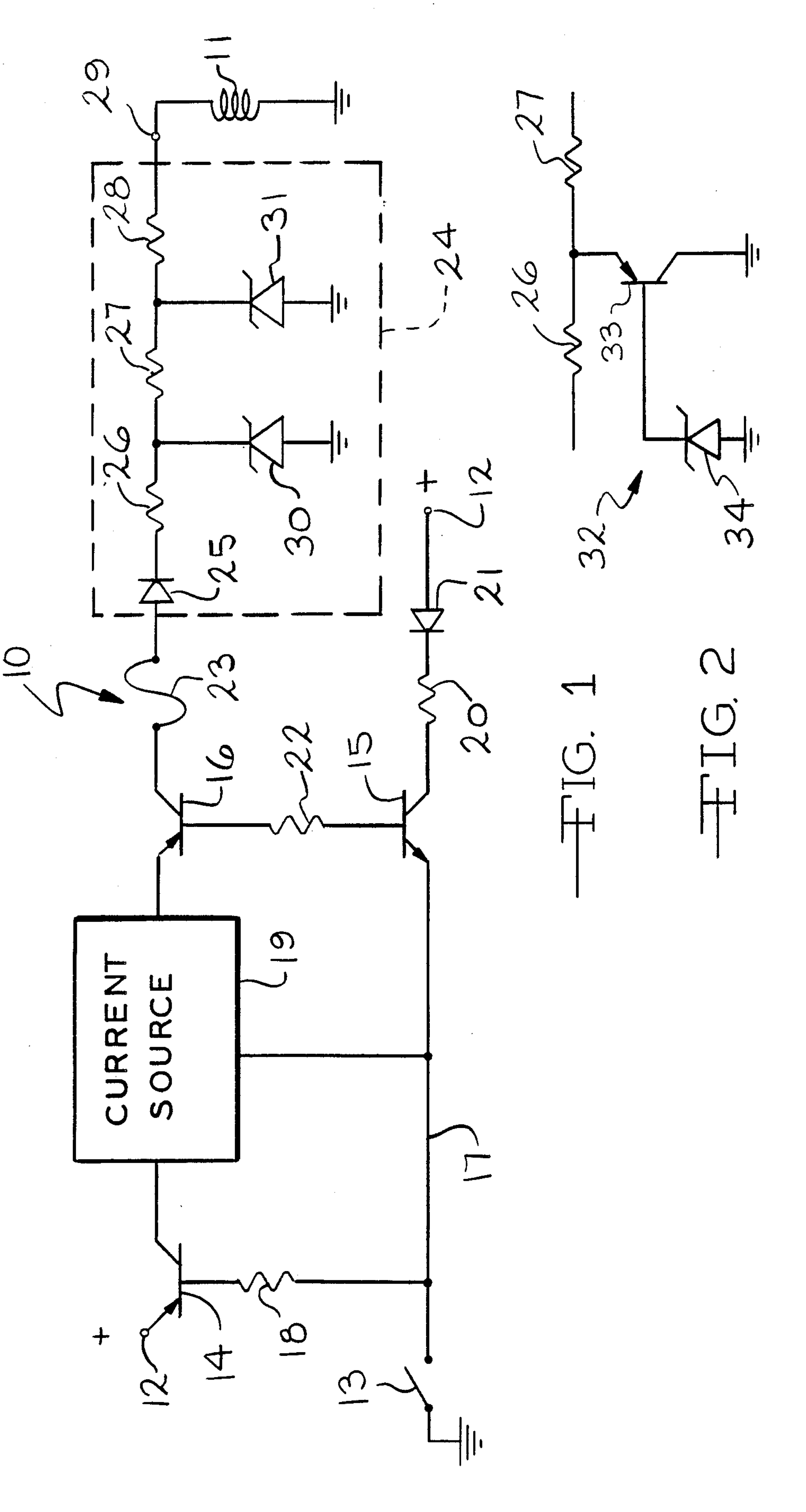
FIG. 1 is a schematic circuit diagram of a power supply according to a preferred embodiment of the invention.
FIG. 2 is a schematic circuit diagram of a voltage limiting circuit for substitution for the zener diodes in the circuit of FIG. 1.

Referring to the drawing, a voltage and current limiting power supply circuit 10 is shown according to a preferred embodiment of the invention. The illustrated and described circuit 10 is designed to supply 12 volts dc at 42 ma. to a valve actuating solenoid 11 located in a hazardous environment, such as a paint spray booth. However, it will be appreciated that the circuit may be modified and adapted for other applications and to supply other voltages and currents. The circuit 10 is operated from a conventional low voltage power source (not shown), such as a 15 volt dc power supply, connected between positive terminals 12 and ground.

The power supply circuit 10 is controlled by an input switching circuit including a switch 13 and three transistors 14, 15 and 16. The switch 13 is connected between a terminal 17 and ground. The terminal 17 is connected through a resistor 18 to the base of the transistor 14. The emitter of the transistor 14 is connected to one positive terminal 12 and the collector of the transistor 14 is connected to the input to a constant current source 19. When the switch 13 is closed, the transistor 14 conducts to apply 15 volts dc from the terminal 12 to operate the current source 19. For operating the solenoid 11, the current source 19 is designed to have a constant current output of 45 ma. The output voltage of the current source 19 will vary, depending on the load, up to a maximum of about 15 volts. The maximum output voltage is limited by the magnitude of the input voltage.

The switched terminal 17 also is connected through the emitter and collector of the transistor 15, a resistor 20 and an LED 21 to one of the positive terminals 12. When the switch 13 is closed, the transistor 15 conducts to allow current to flow through the LED 21, thereby producing a warning light to indicate that the circuit 10 is operating. The base of the transistor 15 is coupled through a resistor 22 to the base of the transistor 16. The transistor 15 turns on the transistor 16 to apply power from the current source 19 through a fuse 23 and a zener barrier circuit 24 to the valve solenoid 11.

Current normally flows in the zener barrier circuit sequentially through a diode 25 and three resistors 26, 27 and 28 to an output 29 which is connected to the solenoid 11 in the spray booth. The diode 25 protects the transistor 16 and the current source 19 from damage in the event that a voltage or transient from an external source is applied to the output 29. The junction between the resistors 26 and 27 is connected through a zener diode 30 to ground and the junction between the resistors 27 and 28 is connected through a zener diode 31 to ground. So long as the maximum voltage from the current source 19 is at a safe level, the zener diodes 30 and 31 will have a breakdown voltage above such maximum voltage, for example, of about 20 volts.

In operation, when the switch 13 is closed, the current source 19 is turned on and 12 volts at 42 ma is applied to the valve solenoid 11. In the event that the output 29 is shorted to ground, the maximum current is limited to the 45 ma available from the current source. In the event that the output 29 becomes an open circuit, the maximum voltage available at the output 29 is the maximum output voltage from the current source 19, or about 15 volts. In the event of a failure in the current source 19 resulting in a higher voltage, the output 29 is clamped to 20 volts by the zener barrier 24. If desired, the zener diodes 30 and 31 may be selected with lower breakdown voltages for clamping the output to a voltage less than the maximum output voltage from the current source 19.

If desired, the zener diodes 30 and 31 of FIG. 1 may be replaced with other types of voltage limiting devices, such as the device 32 illustrated in FIG. 2. The device 32 is an amplified zener circuit consisting of a power transistor 33 and a zener diode 34 which are illustrated connected between the resistors 26 and 27 and ground. The emitter of the transistor 33 is connected to the junction between the resistors 26 and 27 and the collector is connected to ground. The zener diode 34 is connected from the base of the transistor 33 to ground. The power transistor 33 simulates a higher power zener diode in that it is capable of handling greater current than the zener diode while limiting the voltage between the emitter and ground.

I claim:

1. A circuit for supplying power to a normal load at a predetermined current and a predetermined voltage comprising a dc power source having a maximum voltage greater then said predetermined voltage, dc current source means operated from said power source for establishing a constant current output for operating the normal load at said predetermined current and voltage, said current source means output having a maximum voltage no greater then said maximum power source voltage, a resistor and a voltage limiter connected in series across said current source means output, said voltage limiter having a breakdown voltage above said predetermined voltage at the normal load when the load is drawing said predetermined current, and means connecting said load in parallel with said voltage limiter, said voltage limiter limiting the voltage at said load to said breakdown voltage, and wherein the maximum current available from said circuit at a short circuited load is said predetermined current and the maximum voltage available at an open circuited load is the lesser of said breakdown voltage and said maximum current source means output voltage.

2. A power supply circuit, as set forth in claim 1, wherein said voltage limiter is a zener diode.

3. A power supply circuit, as set forth in claim 2, wherein said means connecting said load in parallel with said zener diode includes a second resistor and a second zener diode connected in series across said zener diode and wherein said load is connected across said second zener diode.

4. A power supply circuit, as set forth in claim 1, wherein said maximum voltage from said dc current source is less than the breakdown voltage of said voltage limiter.

5. A circuit for safely energizing a solenoid valve in a paint spray booth, said solenoid normally drawing a predetermined current at a predetermined voltage comprising a dc power source having a maximum voltage greater then said predetermined voltage, dc current source means operated from said power source for establishing a constant current output for energizing said solenoid at said predetermined current and voltage, said current source means output having a maximum voltage no greater then said maximum power source voltage, a resistor and a voltage limiter connected in series across said current source means output, said voltage limiter having a breakdown voltage above said predetermined voltage applied to said solenoid when said solenoid is drawing said predetermined current, and means connecting said solenoid in parallel with said voltage limiter, said voltage limiter limiting the voltage at said solenoid to said breakdown voltage, and wherein the maximum current available from said circuit at said solenoid in the event of a short circuit is said predetermined current and the maximum voltage available at said solenoid in the event of an open circuit is the lesser of said breakdown voltage and said maximum current source means output voltage.

6. A circuit for safely energizing a solenoid valve in a paint spray booth with a predetermined current at a predetermined voltage, as set forth in claim 5, wherein said voltage limiter is a zener diode.

* * * * *